United States Patent [19]
Graham

[11] Patent Number: 5,937,191
[45] Date of Patent: Aug. 10, 1999

[54] DETERMINING AND REPORTING DATA ACCESSING ACTIVITY OF A PROGRAM

[75] Inventor: Marvin L. Graham, West Columbia, S.C.

[73] Assignee: NCR Corporation, Dayton, Ohio

[21] Appl. No.: 08/867,894

[22] Filed: Jun. 3, 1997

[51] Int. Cl.[6] .................................................. G06F 9/44
[52] U.S. Cl. ........................ 395/704; 395/709; 714/35; 714/38; 714/39; 702/182; 702/183
[58] Field of Search .................................. 395/704, 709, 395/705, 500, 183.11, 183.14, 183.15; 714/35, 37, 38, 39; 702/182, 183, 186

[56] References Cited

U.S. PATENT DOCUMENTS

| | | | |
|---|---|---|---|
| 5,212,794 | 5/1993 | Pettis et al. .............................. | 395/709 |
| 5,265,254 | 11/1993 | Blasciak et al. ........................ | 395/704 |
| 5,274,811 | 12/1993 | Borg et al. ............................... | 395/704 |
| 5,432,942 | 7/1995 | Trainer .................................... | 395/708 |
| 5,450,586 | 9/1995 | Kuzara et al. .......................... | 395/704 |
| 5,469,572 | 11/1995 | Taylor ..................................... | 395/710 |
| 5,539,907 | 7/1996 | Srivastava et al. ..................... | 395/704 |
| 5,613,118 | 3/1997 | Heisch et al. ........................... | 395/709 |
| 5,655,122 | 8/1997 | Wu .......................................... | 395/705 |
| 5,689,712 | 11/1997 | Heisch .................................... | 395/704 |
| 5,752,038 | 5/1998 | Blake et al. ............................. | 395/709 |
| 5,758,061 | 5/1998 | Plum ................................... | 395/183.11 |
| 5,764,989 | 6/1998 | Gustafsson et al. .................... | 395/704 |
| 5,768,592 | 6/1998 | Chang ..................................... | 395/704 |
| 5,790,865 | 8/1998 | Smaalders et al. ..................... | 395/709 |

*Primary Examiner*—Tariq R. Hafiz
*Assistant Examiner*—Tuan Q. Dam
*Attorney, Agent, or Firm*—Gerard M. Wissing

[57] ABSTRACT

A program analysis method that profiles blocks of a program when the program is running with representative data and provides reports on the activity of data structures of the program without significantly affect the execution time of the profiled program. Programmers can then use these reports to tune the performance of the program by, for example, reorganizing the program data structures to reduce its data cache usage during execution.

9 Claims, 2 Drawing Sheets

DETERMINING AND REPORTING DATA ACCESSING ACTIVITY OF A PROGRAM

BACKGROUND

1. Field of the Invention

The present application relates to a program analysis method for monitoring and reporting data structure activity of a program. More particularly, the present application profiles basic blocks of a program by monitoring block arcs and provides reports on block and data structure activity of the program to tune the performance of the program when translated to executable program code.

2. Description of the Related Art

Computers typically use translators to transform programs written in high-level programming languages into a form that is machine executable. Translators are typically defined as language processors that accept source code as an input and produce as an output functionally equivalent programs, i.e., object code, that can then be linked by a link editor to form executable program code. One example of a commonly used translator is a compiler which translates high-level source code into machine language object code.

Compiler vendors are continuously trying to improve execution times of programs using various techniques. One such technique used by compiler vendors is to take profile data from the execution of an instrumented program and use the profile data to reorder the program's instructions to decrease the execution time of the executable program.

Current techniques used in obtaining profile data of a program imbed instrumentation into the executable program and then run the instrumented form of the program to obtain the profile data. However, current techniques that imbed instrumentation into the executable program have been known to affect the execution time of the instrumented form of the program. Some of the current techniques have been known to increase the execution time of the instrumented form of the program by as much as ten times the normal execution time. This occurs because the instrumented program dynamically allocates data stored by the program. Thus, a significant consideration in determining whether or not to profile an executable program is the time it would take an instrumented form of the program to obtain the necessary profile data.

Prior attempts to improve program performance altering data layout involved adjusting the storage patterns of non-dynamically allocated global variables. However, this technique does not appear to improve execution times of programs. Another attempt to solve this problem involved monitoring data activity by instrumenting the executing program and recording the data addresses that occur. However, programs so instrumented incur factors of 30 or more times the execution time of the program. In addition, the data produced by this approach is difficult to use productively. That is, the data obtained from this approach requires substantial additional processing before it can be correlated for engineering analysis.

SUMMARY

The present application provides a program analysis method that uses an instrumented form of an executable program to profile the basic blocks of the program while running with representative data and generates information about the number of times each basic block is executed and information about the activity of data structures associated with each basic block. This information is also known as profile information. As the profile information is obtained it is placed in tables in the instrumented form of the program for subsequent processing. Such tables imbedded in the instrumented form of the program are static. That is, such tables are not executed by the program and do not significantly affect the execution time of the program. Once the instrumented form of the program completes execution, the profile information contained in the tables are written to a file. A post processor then retrieves the profile information from the file and processes the information to generate reports on the data structure activity associated with each basic block. These reports are typically analyzed by programmers and used to develop strategies to reorganize data structures to tune the performance of a program, e.g., to improve the efficiency of the executable program. In addition to reorganizing data structures, the program analysis method of the present application also uses the compiler to restructure the instruction stream of a program to also improve the efficiency of the program.

Block execution count information is part of the profile information used to generate the reports on the data structure activity of each basic block. The preferred technique used to obtain block execution count information of an executable program is to monitor block arcs. Blocks arcs represent transitions from one basic block of a program to another basic block. Examples of block arcs include program flow when branching or jumping from one basic block to another, and program flow when execution of one basic block is completed and the program moves on to another basic block. By monitoring block arcs more accurate block execution count information can be obtained. Results from prior techniques are often inaccurate because the block count sequence is disrupted when a program changes threads.

As noted above, one embodiment of the present application involves compiler restructuring of the instruction stream of a program and programmer reorganization of data structures to tune the performance of an executable program. In an alternative embodiment, the compiler can be configured to restructure the instruction stream of a program and to reorganize data structures to tune the performance of an executable program. In this alternative embodiment, a driver program in the compiler can automatically pass command line options to a restructuring module and an optimizer to use the profile information to tune the performance of the program. For example, the restructuring module can be used to determine how data structures should be reorganized so that, for example, the number of cache lines used for a data structure reference is reduced. The compiler will also restructure the instruction stream of the program based on profile data. These restructuring parameters are then imposed on an inliner and the optimizer to effect transformation of the internal code.

To ensure the accuracy of the profile information obtained, the instrumented form of the executable program is executed with representative data so that the profile information is obtained when the program is running as it normally would. Further, by monitoring the block arcs more accurate profile information can be obtained.

Furthermore, by using the arc count method to obtain the profile information and imbedded tables in the instrumented form of the program, the execution time of the instrumented program does not substantially change thus making it practical to profile any size program.

BRIEF DESCRIPTION OF THE DRAWINGS

Preferred embodiments of the invention are described hereinbelow with reference to the drawings wherein.

DETAILED DESCRIPTION

As discussed above, translators such as compilers are used to translate programs written in a high-level programming language into a form suitable for execution by, for example, a computer. Typically, when compiling a program the compiler initially partitions the program into basic blocks in response to command line options from a driver program associated with the compiler. A front-end module of the compiler in response to a command line option from the driver, transforms source code (i.e., the high level program) in each basic block into internal code which is an intermediate form of object code. Optimizations are typically performed on the internal code in response to a command line option, and object code is then generated.

A basic block of a program is a sequence of instructions that are executed together. That is, if the first instruction of a block is executed, then the other instructions in the block should also be executed. Typically, a basic block begins with a label and ends with a conditional or unconditional branch instruction or a return instruction.

Figure 1:
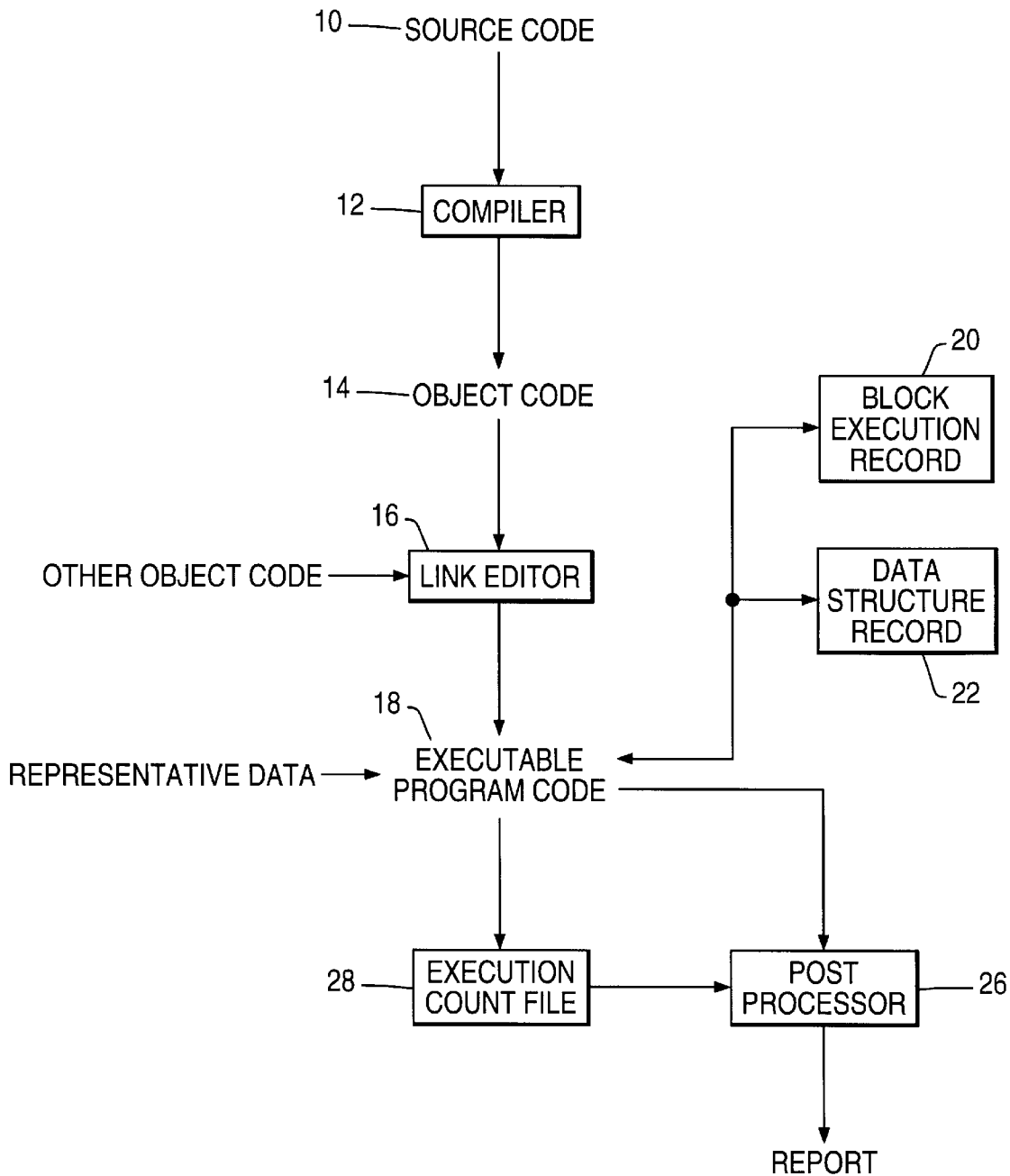
FIG. 1 is a block diagram for translating source code to executable program code and for profiling the executable program code to tune the performance of the program.

FIG. 1 illustrates a block diagram for translating source code to executable program code and for profiling the executable program to tune the performance of the program. As seen in FIG. 1, source code 10 from a source file is typically translated to object code using, for example, a compiler 12. The resultant object code is then linked to object code of other separately compiled programs by link editor 16 to form actual machine executable program code 18.

The program analysis method of the present application involves multiple steps. First, instrumentation is added to the executable program by the compiler. The instrumentation includes executable instructions that obtain the profile information during execution of the program. Instrumentation is defined herein as both added instructions and supporting tables. For example, the instrumentation added to the executable program may be instructions to count the number of times inter-block arcs are used. These counts are used to determine block count profile information. As another example, the instrumentation added may be in the form of tables that contain the arc counts and the identity of basic blocks to which the count pertains. Another table has one entry for every basic block which is organized so you can tell what source module the block came from and what function the block is a member. In addition, for blocks which reference data thru structures there is a pointer to a list that describes the structure reference activity of such blocks.

The next step in the program analysis method according to the present application is to run the instrumented program with representative data so that the profile information can be obtained during typical operation of the program. That is, the instrumentation program is run with data consistent with data used when the program is running as it normally would. There may be multiple forms of representative data. Thus, this step may be performed many times and each time the program is run new representative data is processed. If multiple runs of the program are performed with different representative data, then the profile information associated with each run is stored in separate records. Further, if multiple runs of the program are performed and separate records are generated, the corresponding activity information in each record is combined into a single table and/or record for subsequent processing. Generally, the records are merged by adding the corresponding arc counts from corresponding blocks.

For the program analysis technique according to the present application, profile information of the executable program is obtained when an instrumented form of the program is running. Profile information according to the present application includes, for example, basic block profile information and data structure profile information. The data structure profile information includes: structure identity for each data structure referenced; elements within each structure; referencing patterns of elements within each structure by different basic blocks; and displacement of data structure elements in the structure. The basic block profile information includes: block pair identity; and block arc transition counts.

The data structure records 22 of FIG. 1 consist of a set of lists that are imbedded in a program that is instrumented for data access reporting. There is a list for each basic block that references data via a structure. The list indicates the structure(s) used, the member(s) accessed and the nature (read, write, or read and write) of the access. Preferably, the data structure record 22 is within the instrumented form of the executable program, but the data structure record may also be external to the instrumented form of the executable program. In addition, the basic block profile information is placed in various records, such as block execution record 20, which are preferably within the instrumented form of the executable program but which may be external to the instrumented program as well.

To obtain the block execution count, the instrumented form of the executable program using representative data counts block arc transitions. Block arcs represent transitions from one basic block of a program to another basic block. Examples of block arcs include program flow when branching or jumping from one basic block to another, and program flow when execution of one basic block is completed and the program moves on to another basic block. As noted, by counting block arc transitions more accurate block execution count information can be obtained.

Upon completion of the program with representative data, the number of times each basic block is referenced (i.e., the block execution count) and the block reference information that are maintained in the executable program in block execution record 20 are written to execution count file 28.

The program analysis method according to the present application also reports for each basic block what data structures (or records) are referenced, identifies the elements of each data structure referenced for each basic block, identifies patterns of access to the elements, and the displacement of the element in the cache. The data structure reference lists are preferably maintained in the executable program in data structure record 22.

In a third step of the program analysis method, the profile information is transferred to a post processor that computes execution counts for each basic block using the arc transition information and generates single or multiple program activity reports illustrating the profile information. For example, a report may provide a listing including the names of data structures referenced by each basic block when the program is executed with the representative data, the names of each element in the data structure referenced, patterns of access to each element of each data structure for each basic block referencing the data structure (e.g., was the element read from the cache, written to the cache or both), the displacement of the element in the cache line from the beginning of the cache, and the number of times each data structure is referenced. Further, the report may illustrate how often each basic block of the program is executed when the program is running with representative data.

Table I below provides an example of a program activity report generated by the post processor:

TABLE I

| Reference Count | Data Structure Identification | Access technique/ Data Structure Element/displacement |
|---|---|---|
| 80123456 | spinlock | r/p1/[36] |
| 78234567 | saledata | r/store/[8] |
|  |  | r/cost/[4] |
|  |  | w/sellprice/[12] |
| 12345678 | saledata | r/store/[16] |
|  |  | w/data/[8] | where r = read and w = write.

Alternatively, the post processor 26 can retrieve the profile information of heavily executed traces during execution of the instrumented program. For background, a trace is a sequence of basic blocks that are typically executed together. Typically, heavily executed traces (also known as hot traces) perform a majority of the data structure referencing during execution of a program so that reorganizing data structures and rearranging the instruction stream of basic blocks in hot traces will improve program execution efficiency.

From this program activity report, the performance of the program can be tuned. That is, the programmer can reorganize the data structures so that cache resources are more efficiently used. For example, the number of cache lines used when running the program can be reduced. As noted, the compiler restructures the instruction stream of the program to further optimize the performance of the program.

In a fourth step according to the program analysis method according to the present application, after the data structures have been reorganized and the instruction stream of the program has been rearranged, the program is re-compiled and run with the same representative data to verify that the re-compiled program runs more efficiently. If the recompiled program runs at a desired efficiency rating, the object code generated therefrom will be used as the object code for the executable program code. However, if the efficiency rating is not satisfactory, the data structures can be reorganized and the instruction stream can be rearranged differently and the program re-complied until the desired efficiency rating is achieved. Additional reorganization and restructuring techniques can be found in "NCR High Performance C/C++ Optimizations Guide", Document Number B003-0177-A000.

Figure 2:
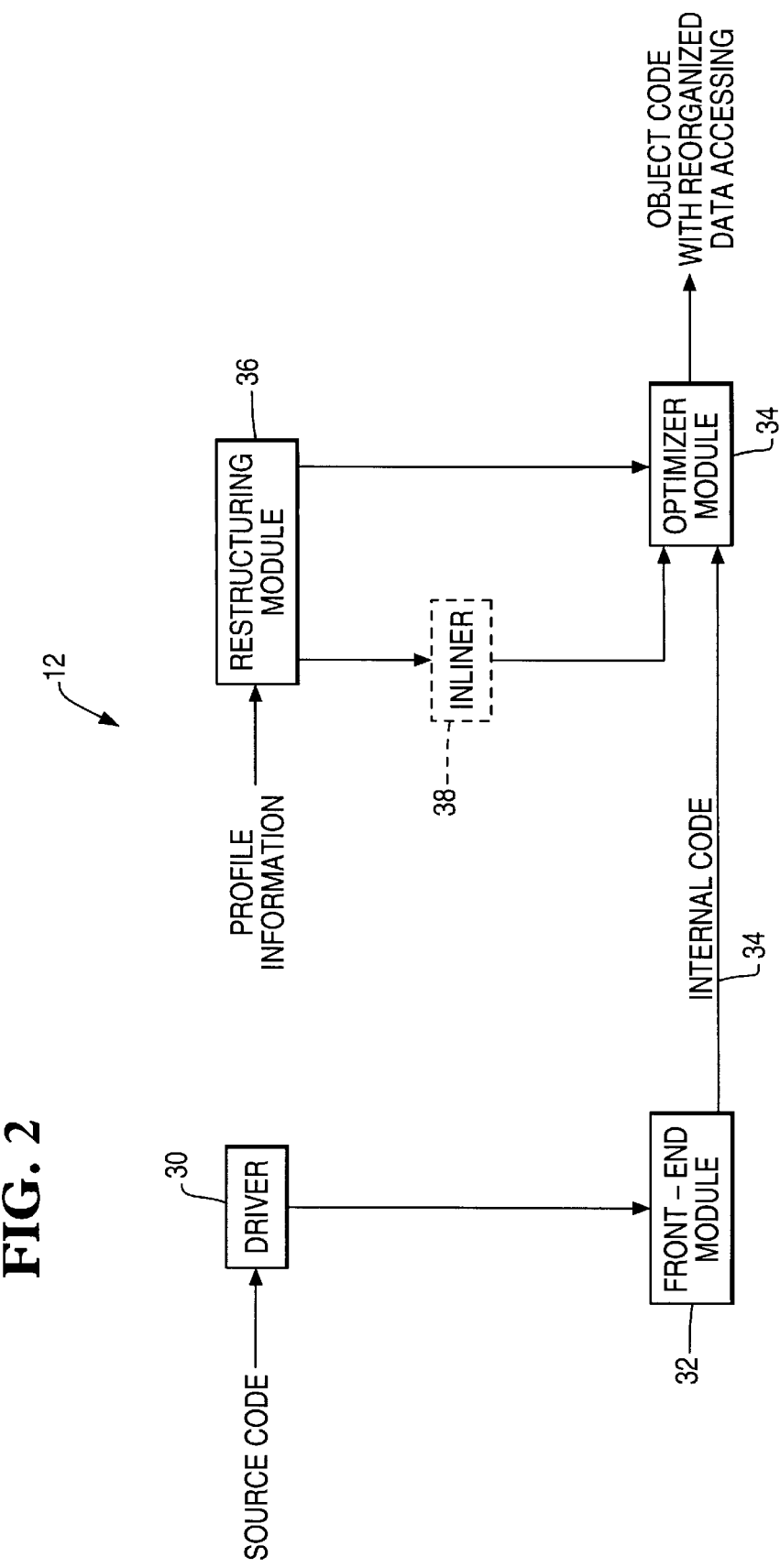
FIG. 2 is a block diagram of the compiler of FIG. 1 having a restructuring module for automatic program restructuring and data structure reorganization.

In an alternative embodiment, the program analysis method of the present application can be configured to automatically reorganize the data structures and to restructure the instruction stream of the executable program, and then recompile the program in response to a command line option. An exemplary block diagram for restructuring and recompiling the program is shown in FIG. 2. In this embodiment, the compiler 12 of the present application uses a compiler driver program 30 and multiple compiler modules to translate the source code to ordinary object code with reorganized data structure accessing. An example of a compiler having a suitable compiler driver program is the SCDE 3.02 compiler developed by the NCR Corporation which is used in UNIX based systems. However, other compiler modules or components that may be used with other operating systems are also contemplated. Such compiler components or modules include drivers, front ends, inliners, optimizers and link editors.

The compiler driver program 30 responds to command line instructions (also known as options) that call upon the various compiler modules or facilities. One module used in the compiler 12 of the present application is a front-end module 32 that transforms the source code into internal code which is an intermediate form of object code. Such front-end modules are known.

Another module used by the compiler 12 of the present application is an optimizer module 34. The optimizer 36 translates the internal code generated by the front-end module 32 to improve the structure of the final executable program 20. For example, the optimizer module 34 may improve the structure of the executable program so as to improve program efficiency and reduce execution times of the program. Examples of functions performed by the optimizer include computing common sub-expressions once, removing constant operations from loops, and optimizing the use of registers. More sophisticated optimization techniques are also known and contemplated for the compiler of the present application.

A restructuring module 36 receives profile information from, for example, the block execution table and the data structure record after termination of the instrumented program. The restructuring module then determines if the data structures can be reorganized so that fewer cache lines are used to improve the execution time of the program. For example, the cache resources may be reallocated so that data structure elements of most frequently used data structure patterns use the same cache line. As noted, the compiler also restructures the instruction stream of the program. Preferably, the instructions stream of the program may be restructured so that the most frequently executed paths consists of contiguous basic blocks. That is, the basic blocks of the program can be arranged so that the most frequent path taken at a conditional branch falls through to the next sequential basic block as opposed to jumping to a non-sequential successor block. In addition, unconditional branches from a source basic block to a destination basic block that occur in frequently executed paths can be removed by, for example, placing the source and destination basic blocks involved together.

The restructuring module 36 then imposes the restructuring transformations for the program to the internal code generated by the front-end module 32. Preferably, the imposition of the restructuring transformations occurs in conjunction with the optimizer module. Alternatively, an inliner module 38 may be used to impose the restructuring transformations into the program. In addition, the inliner 38 replaces various function calls in the source code transformed by the front-end module 32 with the body of the function during compilation of the program. Preferably, the inliner replaces the function call with the body of the function when the called function meets predefined conditions.

It will be understood that various modifications can be made to the embodiments of the present invention herein without departing from the spirit and scope thereof. Therefore, the above description should not be construed as limiting the invention, but merely as preferred embodiments thereof. Those skilled in the art will envision other modifications within the scope and spirit of the invention as defined by the claims appended hereto.

What is claimed:

1. A method for determining and reporting profile information of a program to facilitate tuning the performance of the program, comprising:

imbedding instrumentation in the program that monitors execution of the program;

running the program with representative data and extracting profile information;

maintaining statically said profile information within said instrumented program at least when the program is running and transferring the profile information to a post processor after the program stops running; and processing said profile information to generate program activity reports which can be used to tune the performance of the program.

2. The method according to claim 1 further comprising:

reorganizing data structures of the program to reduce the data cache usage of the program in response to said program activity report; and running the program with said reorganized structures and said representative data and determining the efficiency of the running program.

3. The method according to claim 2, wherein the data structures of the program are reorganized by a user.

4. The method according to claim 2, wherein the data structure elements of the program are automatically reorganized.

5. The method according to claim 1 further comprising:

rearranging an instruction stream of the program in response to said program activity report; and running the program with said rearranged instruction stream and said representative data and determining the efficiency of the running program.

6. The method according to claim 1, wherein said profile information comprises block execution information and data structure activity information.

7. The method according to claim 6, wherein said block execution information comprises block arc transition data which defines basic blocks of the program executed, and a count value for each basic block executed, said count value defining the number of times a basic block of the program is executed.

8. The method according to claim 6, wherein said data structure activity information comprises information identifying data structures referenced during execution of the program, elements associated with each data structure referenced, patterns of access to said elements of each data structure, the displacement of said element in a cache line and the number of times a data structure is referenced.

9. A method for determining and reporting profile information of a program to facilitate tuning the performance of the program, comprising:

imbedding instrumentation in the program that monitors execution of the program;

running the program with representative data and extracting block execution profile information and data structure profile information, said block execution profile information being obtained at least in part monitoring block arcs;

statically maintaining said profile information within said instrumented program at least when the program is running and transferring the profile information to a post processor after the program stops running; and processing said profile information to generate program activity reports which can be used to tune the performance of the program.

* * * * *